US011146048B2

(12) United States Patent
Wilson, Sr.

(10) Patent No.: US 11,146,048 B2
(45) Date of Patent: Oct. 12, 2021

(54) SERVICE ENTRANCE HEAD AND METHODS

(71) Applicant: Laurin T. Wilson, Sr., Georgetown, SC (US)

(72) Inventor: Laurin T. Wilson, Sr., Georgetown, SC (US)

( * ) Notice: Subject to any disclaimer, the term of this patent is extended or adjusted under 35 U.S.C. 154(b) by 135 days.

(21) Appl. No.: 16/579,919

(22) Filed: Sep. 24, 2019

(65) Prior Publication Data

US 2020/0099204 A1     Mar. 26, 2020

Related U.S. Application Data

(60) Provisional application No. 62/735,247, filed on Sep. 24, 2018, provisional application No. 62/847,495, filed on May 14, 2019.

(51) Int. Cl.
*H02G 3/04* (2006.01)
*H01B 17/66* (2006.01)
*H01B 17/58* (2006.01)

(52) U.S. Cl.
CPC ......... *H02G 3/0418* (2013.01); *H01B 17/583* (2013.01); *H01B 17/66* (2013.01)

(58) Field of Classification Search
CPC .......... H02G 3/0418; H02G 3/06; H02G 3/02; H02G 3/22; H02G 3/0437; H02G 3/04; H02G 3/24; H02G 3/26; H01B 17/583; H01B 17/66
USPC ............ 174/163 R, 79, 81, 93, 72 R, 80, 82; 385/134, 135; 285/45, 179
See application file for complete search history.

(56) References Cited

U.S. PATENT DOCUMENTS

| | | | |
|---|---|---|---|
| 1,888,645 A * | 11/1932 | Wheeler | H02G 3/06 174/79 |
| 2,065,297 A | 12/1936 | Wiechers | |
| 2,404,152 A | 7/1946 | Weller | |
| 2,423,350 A | 7/1947 | Stockton | |
| 2,648,721 A | 8/1953 | Wayman | |
| 2,739,999 A | 3/1956 | Gill | |
| 2,865,981 A | 12/1958 | Budnick | |
| 2,908,745 A | 10/1959 | Appleton | |
| 2,926,212 A | 2/1960 | Appleton | |
| 2,993,084 A | 7/1961 | Curtiss | |
| 3,287,488 A | 11/1966 | Piasecki et al. | |
| 3,328,513 A * | 6/1967 | Goldsobel | H02G 3/22 174/81 |

(Continued)

OTHER PUBLICATIONS

The Home Depot, 2 in. Service Entrance (SE) Cap, Aug. 13, 2018, https://www.homedepot.com/p/2-in-Service-Entrance-SE-Cap-58020/100183949.

(Continued)

*Primary Examiner* — Angel R Estrada
(74) *Attorney, Agent, or Firm* — Douglas Lineberry

(57) ABSTRACT

An improved service entrance head including (a) a head or cap, (b) cap support or collar, (c) segmented conduit mounting and (d) an insulating service wire support or wire separator, that allows for replacement of an installed service entrance head with the service passing through the collar and separator without requiring that the service be severed. Both the collar and the wire separator may be segmented so that they can be removed from a position surrounding the service and replaced. Methods are disclosed.

17 Claims, 20 Drawing Sheets

(56) References Cited

U.S. PATENT DOCUMENTS 3,337,689 A     8/1967   Rudolph et al.
4,876,414 A * 10/1989   Johnson .................. H02G 3/22
                                                            174/81

OTHER PUBLICATIONS terrylove.com, Replace weatherhead without turning off service?, May 23, 2008, https://terrylove.com/forums/index.php?threads/replace-weatherhead-without-turning-off-service.210.
Garvin, Split Ground Bushing, Zinc Die Cast, 4 in, Aug. 13, 2018, https://www.garvinindustries.com/fittings/rigid-conduit-fittings/split-grounding-bushings/sgb400.

* cited by examiner

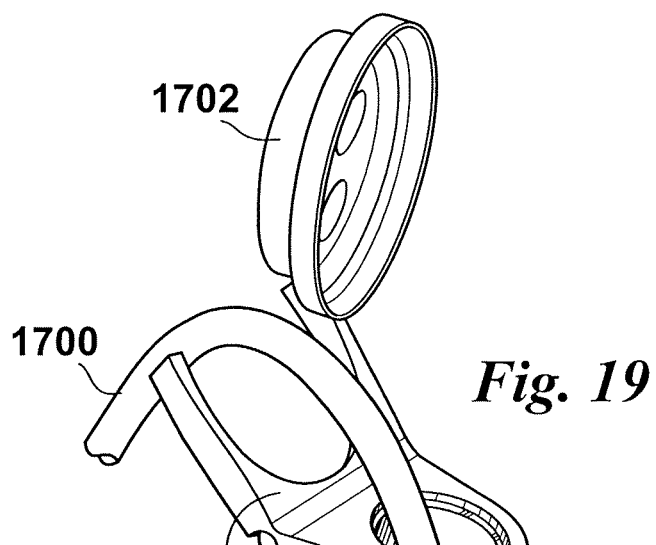
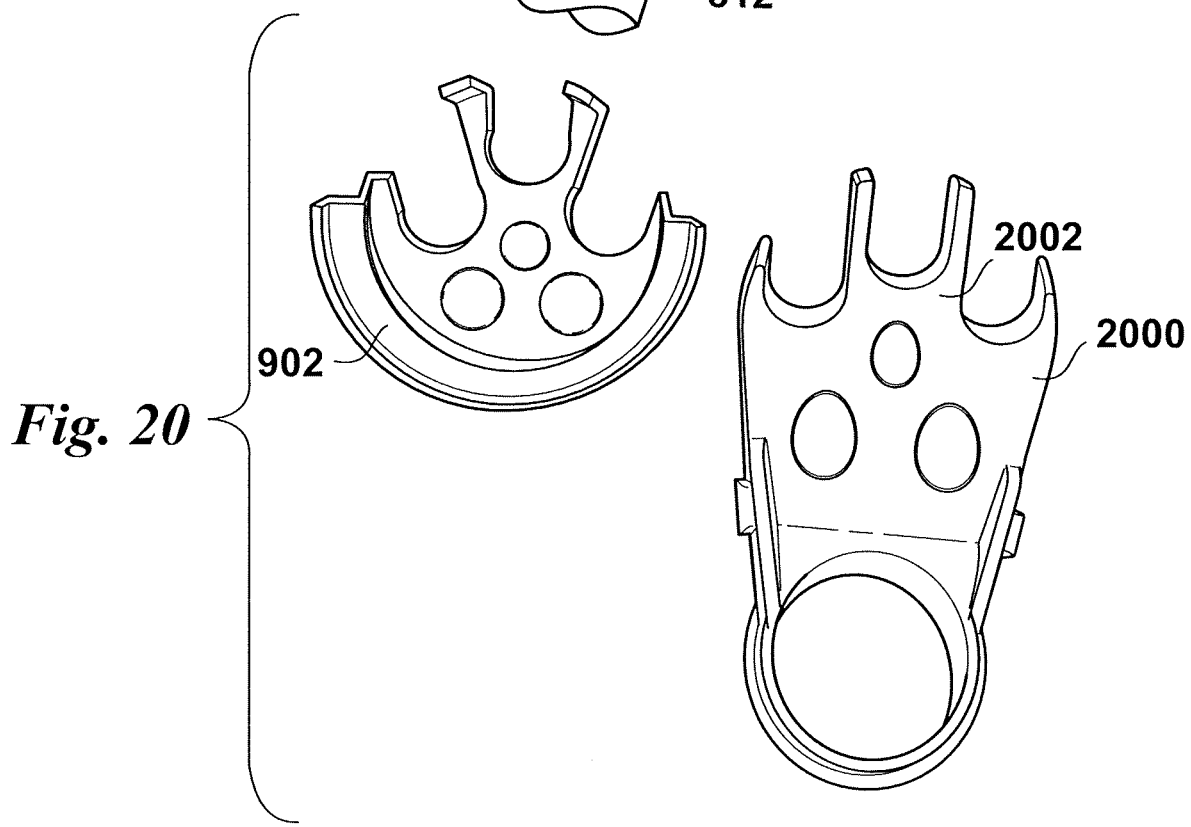

SERVICE ENTRANCE HEAD AND METHODS

BACKGROUND OF THE INVENTION

1) Field of the Invention

The present invention relates to an improved service entrance head that allows for replacement of the service entrance head without requiring that the wiring/lines within the service head be severed.

2) Description of Related Art

A weatherhead—also called a weathercap, service head, service entrance cap, or gooseneck (slang)—is a weatherproof service drop entry point where overhead power, data, or telephone wires enter a building, or where wires transition between overhead and underground cables. At a building, the wires enter a conduit (e.g., a protective metal pipe) and the weatherhead is a waterproof cap on the end of the conduit that allows the wires to enter without letting in water, insects, debris, etc. As explained in greater detail *infra*, the "weatherhead" or "service entrance head" (i.e., the entire device attached to the conduit through which the electrical "service" enters the conduit) is sometimes referred to as a "weathercap" while "cap" is also used for the participation hood that overlies the device. Similarly, the structure that secures the device to the conduit (generally referenced as a "clamp") is not to be confused with the "collar" or portion of the device that surrounds the end of the conduit, despite the fact that the same structure may be combined to perform both the collar and clamp functions and referred to by one or both names. Because the "collar" supports the "cap", it is sometimes referenced as the "cap support". Likewise, the "service" is the wires (or groups thereof) passing through the conduit and the collar under the "cap". The insulating structure that supports and separates the wires (or groups thereof) as they exit the "head" is sometimes referenced as a "wire separator" or "wire support" and, because of its lack of electrical conductivity, as an "insulator".

A weathercap is shaped like a hood, with the surface where the wires enter facing down at an angle of at least 45°, to shield it from precipitation. A rubberized gasket makes for a tight seal against the wires. Before they enter the weatherhead, a drip loop is left in the overhead wires, which permits rain water that collects on the wires to drip off before reaching the weatherhead. Weatherheads are required by electrical codes or building codes. They are also used on utility poles where overhead power lines enter a conduit to pass underground.

Multiple prior designs for weatherheads, or as described herein, service entrance caps exist. For example, U.S. Pat. No. 3,287,488 discloses service cable entrance fittings adapted for use in connecting a service entrance cable to outside electric power lines. More particularly, the invention provides a hooded, non-metallic service cable entrance fitting, in different sizes, which is adapted to be secured or attached to a building structure generally for reception and/or connection thereto of nonmetallic, sheathed electric service cable of corresponding size or capacity. See FIG. 1, which shows multiple views of the prior design.

U.S. Pat. No. 2,423,350 discloses a weather-proof connector and insulator for outdoor use, such as on the wall of a building, to connect the leads from power lines to inside service entrance lines in a quicker and easier manner than is possible with other connectors, and with all connections adequately protected against the weather while at the same time being readily accessible for repair or renewal as required. (Abstract.)

U.S. Pat. No. 3,337,689 relates to a service entrance head for mounting on one end of electric wire conduit, and includes a base or frame provided with a socket portion that receives the end of the conduit and a forwardly disposed insulator supporting portion that receives a conventional insulator, a cover or hood that closes the head, and a clamping strap for clamping the head body or frame to the conduit. The frame insulator support portion is in the form of a pair of arcuate arms that define a semi-circular shoulder on which the insulator is mounted, with the arms at their tips being formed with opposed protuberances that are proportioned to make a snap fitting engagement with the insulator when it is applied to the shoulder. The head cover or hood is hinged to the frame for swinging movement between open and closed positions, and the cover and frame include cooperating lugs to hold the insulator in place when the cover is closed, with the cover being held in its closed position by a friction type catch. (Abstract.)

U.S. Pat. No. 2,065,297 provides flexible conduit connecters, and is particularly concerned with elbow type connectors for connecting flexible conduit to an outlet box or switch box or a housing, such as a transformer housing. Conduit connecters are customarily provided with a threaded member which projects through the aperture in the box, and a nut is mounted on the inside of the box to clamp the connecter to the box. Where such connecters are used on transformer housings, such as those for ignition transformers, the housing is customarily filled with a compound in which the nut is embedded, and if the elbow is secured in one position and it is discovered that the elbow should go off in a different direction, it is impossible to turn the elbow without loosening this connection to the box because the nut is embedded in the compound. (Abstract.)

Other prior designs include U.S. Pat. Nos. 2,648,721, 2,865,981, 2,993,084, 2,908,745, 2,926,212, and 2,404,152.

A major failing of the prior designs is the requirement that when an entrance or service head needs to be replaced, the service or wiring running under the cap and through the collar and insulator be severed or disconnected to remove the exiting entrance head and/or install a new one. Severing or disconnecting the wiring then requires either running new wiring through the replacement/new entrance head or pulling the original wire back through.

In a modern urban setting, a service entrance cap installation for previously installed wiring/lines may require not just the effort of cutting/disconnecting and rewiring but also multiple visits by multiple different utilities depending on the wiring contained within the cap. For instance, a cap containing electrical wiring and fiber optics might require visits from an electrical utility, a cable provider, as well as a telephone provider to reinstall the severed/disconnected wiring/lines. Accordingly, it is an object of the present invention to provide an improved, more efficient service entrance cap that allows for replacement of a damaged or aged entrance head or installation of a new cap for "in place" wiring/lines without requiring the wiring/lines running through the original entrance head to be severed or disconnected during the installation.

BRIEF SUMMARY OF THE INVENTION

The above objectives are accomplished according to the present invention by providing in a first embodiment an improved service entrance cap support. The support may include a sectioned mounting collar including at least two sections, a receiving column formed from the at least two sections of the sectioned mounting collar, a multi-piece wire separator including at least a wire support and an enclosing brace; and an insulator support configured to hold the multi-piece wire separator. Further, the at least two sections of the sectioned mounting collar are separable and rejoinable to one another. Still yet, the support may be shaped to fit a service entrance head cap. Again, the multi-piece wire separator includes removable sections. Still again, the multi-piece wire separator includes at least one slot. Yet further, the enclosing brace includes at least one engaging arm. Again still, the enclosing brace engages with the wire support via the least one engaging arm. Further still, the sectioned mounting collar forms an inner support ledge. Again still, the enclosing brace comprises at least two sections. Yet further, the insulator support may be tilted from 20-90 degrees with respect to the sectioned mounting collar.

In a further embodiment, a method for forming an improved service entrance cap support may be provided. The method may include a sectioned mounting collar comprising at least two sections, at least two sections to define a receiving column, forming a multi-piece wire separator comprising at least a wire support and an enclosing brace, and forming an insulator support configured to hold the multi-piece wire separator. Still further, at least two sections of the sectioned mounting collar may be formed to be separable and rejoinable to one another. Again, the improved service entrance cap support may be shaped to fit a service entrance head cap. Still yet, the multi-piece wire separator may be formed with removable sections. Further, the multi-piece wire separator may be formed to include at least one slot. Still yet, the enclosing brace may be formed to include at least one engaging arm. Yet still, the enclosing brace may engage with the wire support via the at least one engaging arm. Again yet, the insulator support may be tilted from 20-90 degrees with respect to the sectioned mounting collar.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 19 shows a one-piece, prior art wire separator.

FIG. 20 shows a comparison of one embodiment of a wire support of the current disclosure vis-à-vis a further embodiment of a hybrid support.

Figure 1:
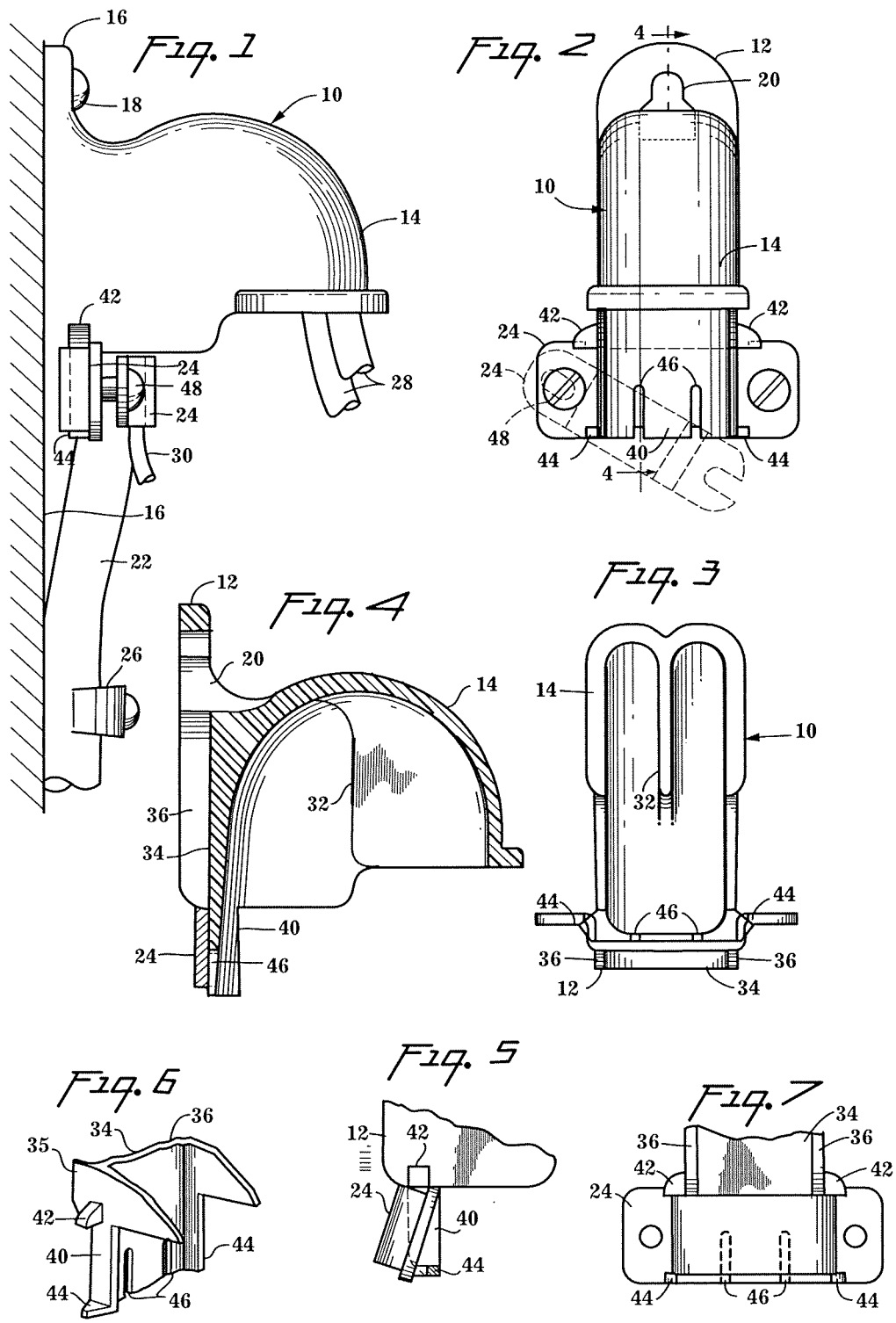
FIG. 1 shows a prior art design.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 2:
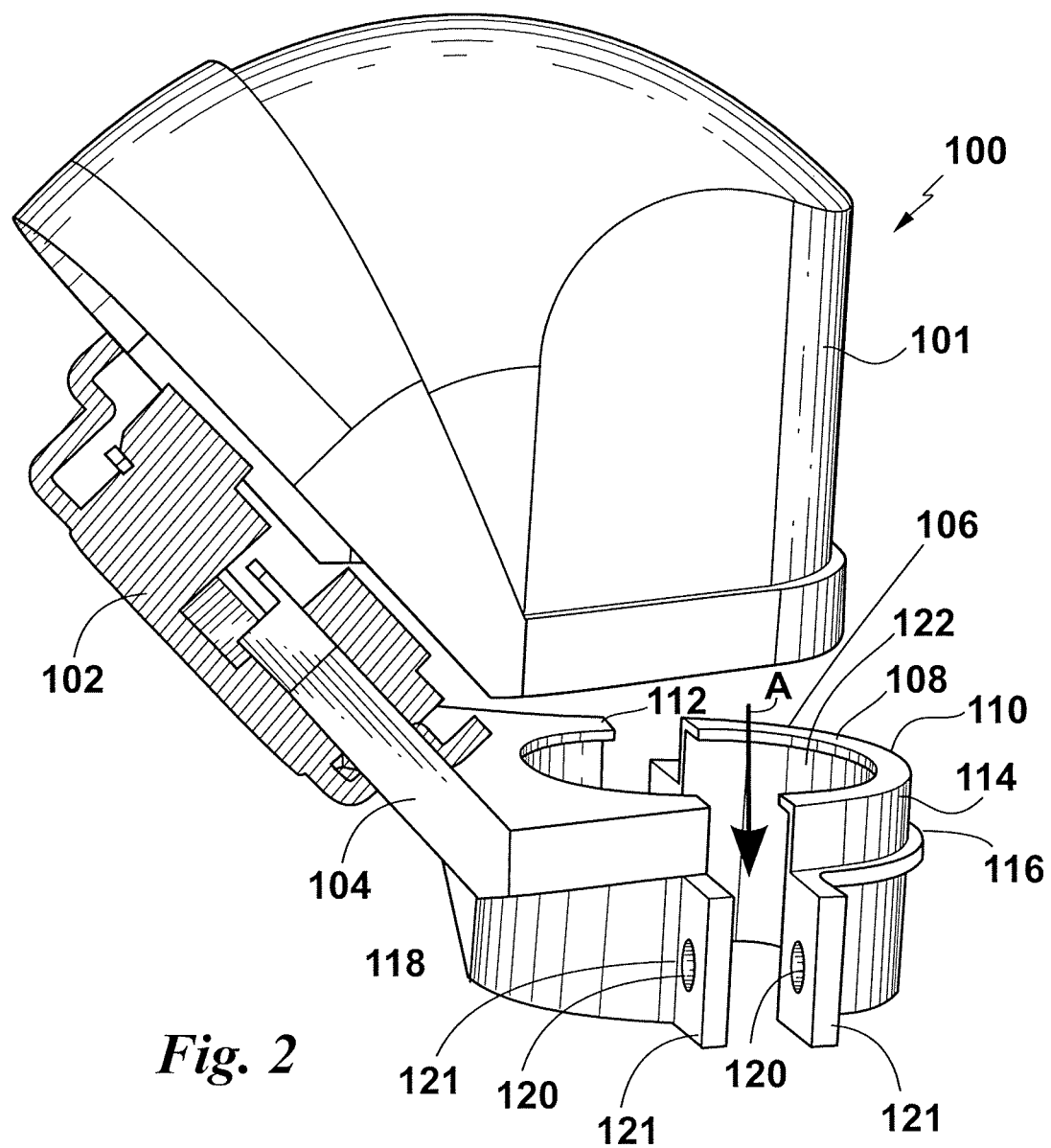
FIG. 2 shows one embodiment of a service entrance cap of the current disclosure.

The current disclosure provides an improved service entrance head that allows for installation/replacement of a service entrance head without requiring that the wiring/lines within the service head be severed or disconnected as described herein. FIG. 2 illustrates one embodiment of a service entrance cap 100 of the current disclosure. Service entrance cap 100 may include an enclosing cap 101, a wire separator 102 for arranging wires entering service entrance cap 100, an insulator support 104, and a sectioned mounting collar 106. Wire separator 102 may also serve as insulation for the device of the current disclosure. Sectioned mounting collar 106 while shown as bifurcated may in other embodiments contain three, four, five or more segments to form the circumference of sectioned mounting collar 106. Further, sectioned mounting collar 106 may be formed from metals, plastics, synthetics or other materials as known to those of skill in the art. In a preferred embodiment, section collar 106 may be formed from aluminum.

In prior designs, the sectioned mounting collar of the current disclosure is a unitary piece forming a continuous, unbroken support surface. In the current disclosure, upper support surface 108 is comprised of, at least, first support surface 110 and second support surface 112, which are separable and rejoinable to one another via methods as known to those of skill in the art such as grooves, screws, bolts, non-permanent adhesives, frictional engagement, etc. Further, the collar may be hinged on one side or both to allow for rejoinability. This allows for the collar to be removed and replaced repeatedly without requiring replacement or destruction of the collar being manipulated. Further, wire receiving column 114 is formed from, at least, first receiving section 116 and second receiving section 118. In prior art devices, the upper portion of the receiving column forms a single, continuous, unbroken lip for engagement with the lower section of the cap.

Figure 3:
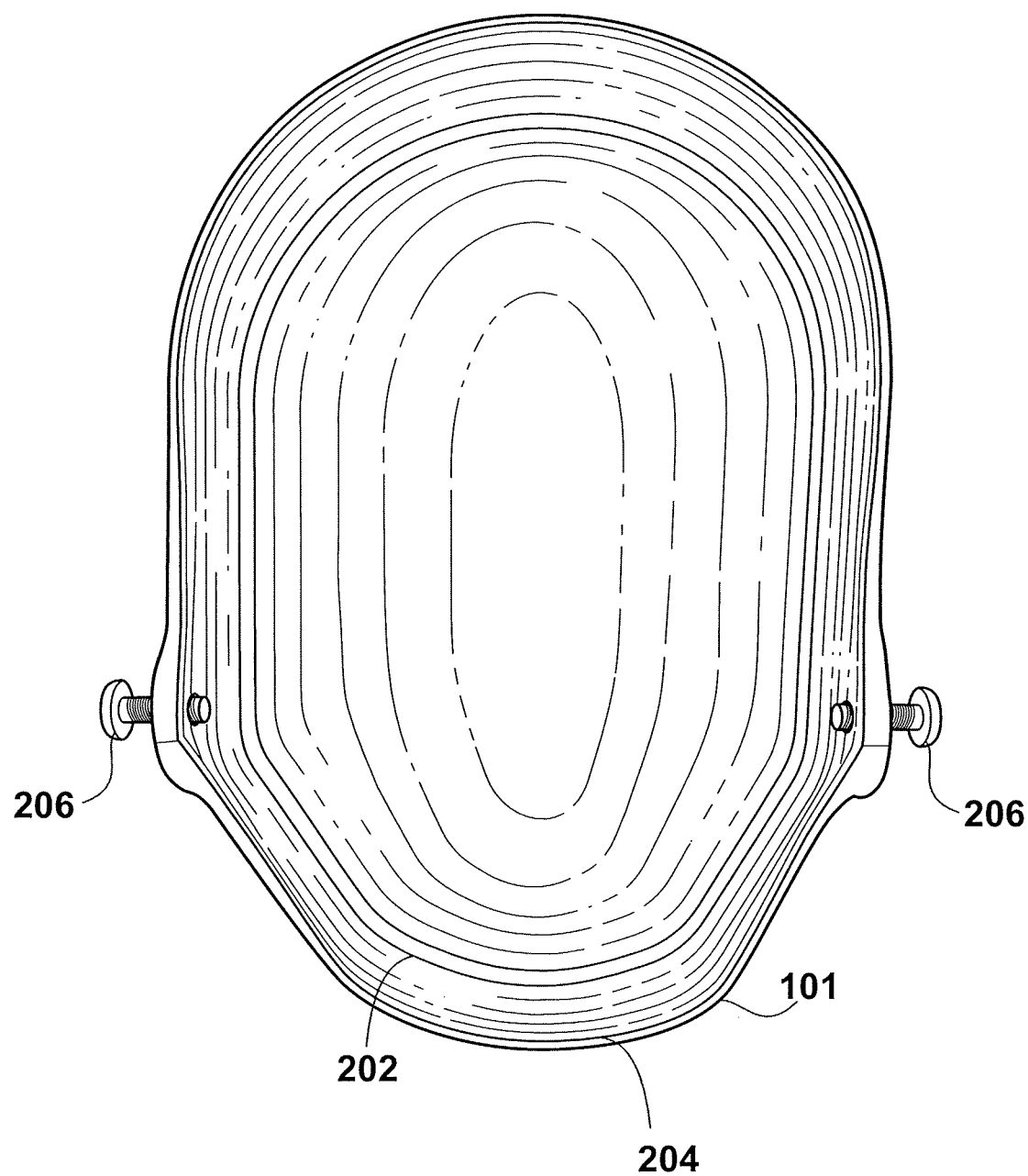
FIG. 3 shows one embodiment of an enclosing cap of the current disclosure.

In the current disclosure, first receiving section 116 and second receiving section 118 engage with an underside ridge 202, see FIG. 3, of enclosing cap 101. The sectioned nature of wire receiving column 114 does not encourage leakage as upper support surface 108 is covered by side wall 204 of enclosing cap 101 as underside ridge 202 rests upon upper support surface 108. Enclosing cap 101 may engage sectioned mounting collar 106 via frictional engagement of tighteners 206, such as via tightening screws to engage with the outer surface of sectioned mounting collar 106.

Sectioned mounting collar 106 may define openings 120 via conjoining flanges 121 for allowing a screw or other means as known to those of skill in the art to secure first receiving section 116 and second receiving section 118 to one another or to secure addition sections, if same are present. The interior 121 of openings 120 may be threaded or otherwise formed to allow sectioned mounting collar 106 to be assembled and disassembled without requiring any change to the wiring/line contents surrounded by service entrance cap 100.

One of the key improvements of the current disclosure is that wiring, lines, or other items, represented by arrow "A" in FIG. 2, that pass through the receiving column 122, do not need to be severed and/or disconnected in order to install or replace service entrance cap 101 around the items represented by A. Indeed, by simply detaching first receiving section 116 from second receiving section 118, full access to wires/lines A is provided and a new cap may be added with minimum effort due to the reassembly of sectioned mounting collar 106, either the original or a replacement/new sectioned mounting collar 106, via tightening screws, bolts, or other affixing devices through openings 120.

Figure 4:
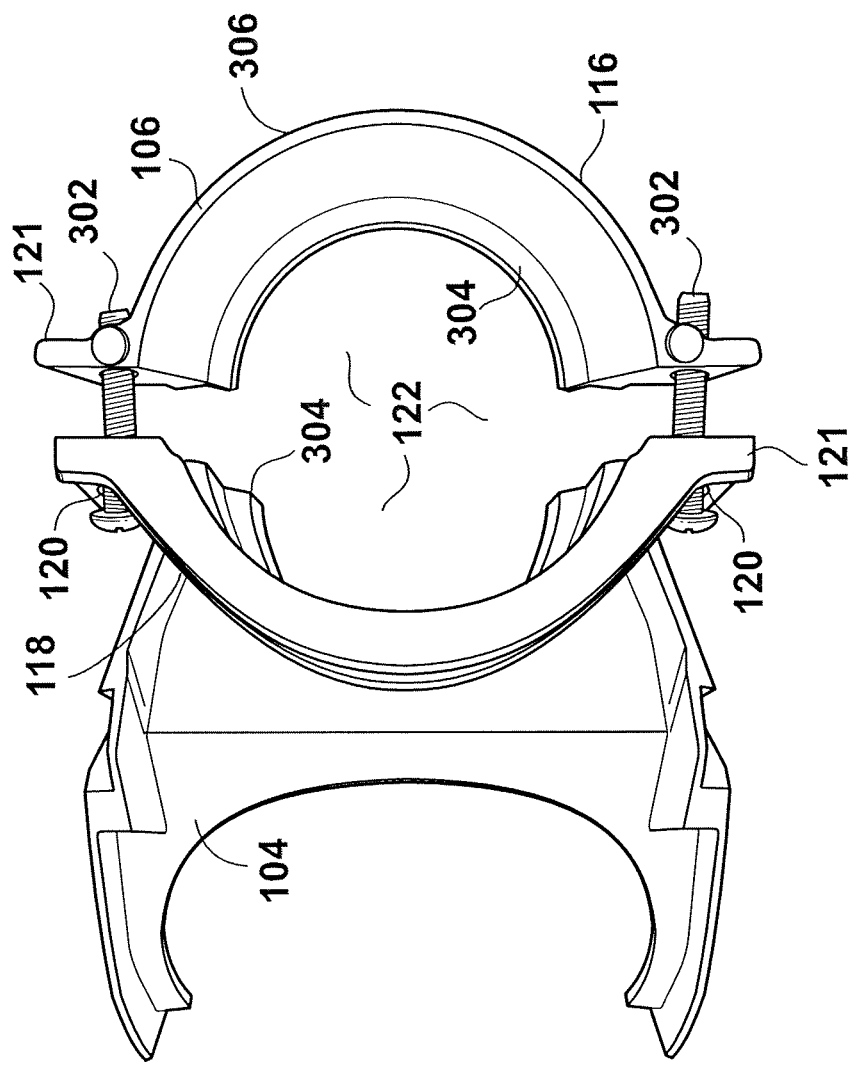
FIG. 4 shows a bottom view of one embodiment of sectioned mounting collar of the current disclosure.

FIG. 4 shows a bottom view of one embodiment of sectioned mounting collar 106 of the current disclosure with affixing devices 302, here shown as threaded screws, partially connecting first receiving section 116 and second receiving section 118. FIG. 4 also shows inner support ledge 304 of sectioned mounting collar 106. Inner support ridge 304 runs circumferentially along the inner top section of first and second receiving sections 116 and 118. Inner support ridge 304 serves to sit atop a pipe, PVC tube, or other columnar device, not shown, which allows wiring/lines A to enter into a home, business, or other structure. Inner support ridge 304, when first and second receiving sections 116 and 118 are connected to one another via tightening of screws 120, also serves to prevent water from entering and flowing down column interior 122 by engaging and overlapping the columnar support and forming yet another barrier against entry into column interior 122. Further, sectioned mounting collar 106 may also be designed to have an adjustable circumference by forming additional segments from collar wall 306 and securing same with screws 302 via additional holes 120 and conjoining flanges 121, such as three, four, five, or more segments, thus, the disclosure should not be considered limited to just two segments of collar wall 306 nor to a static circumference.

Figure 5:
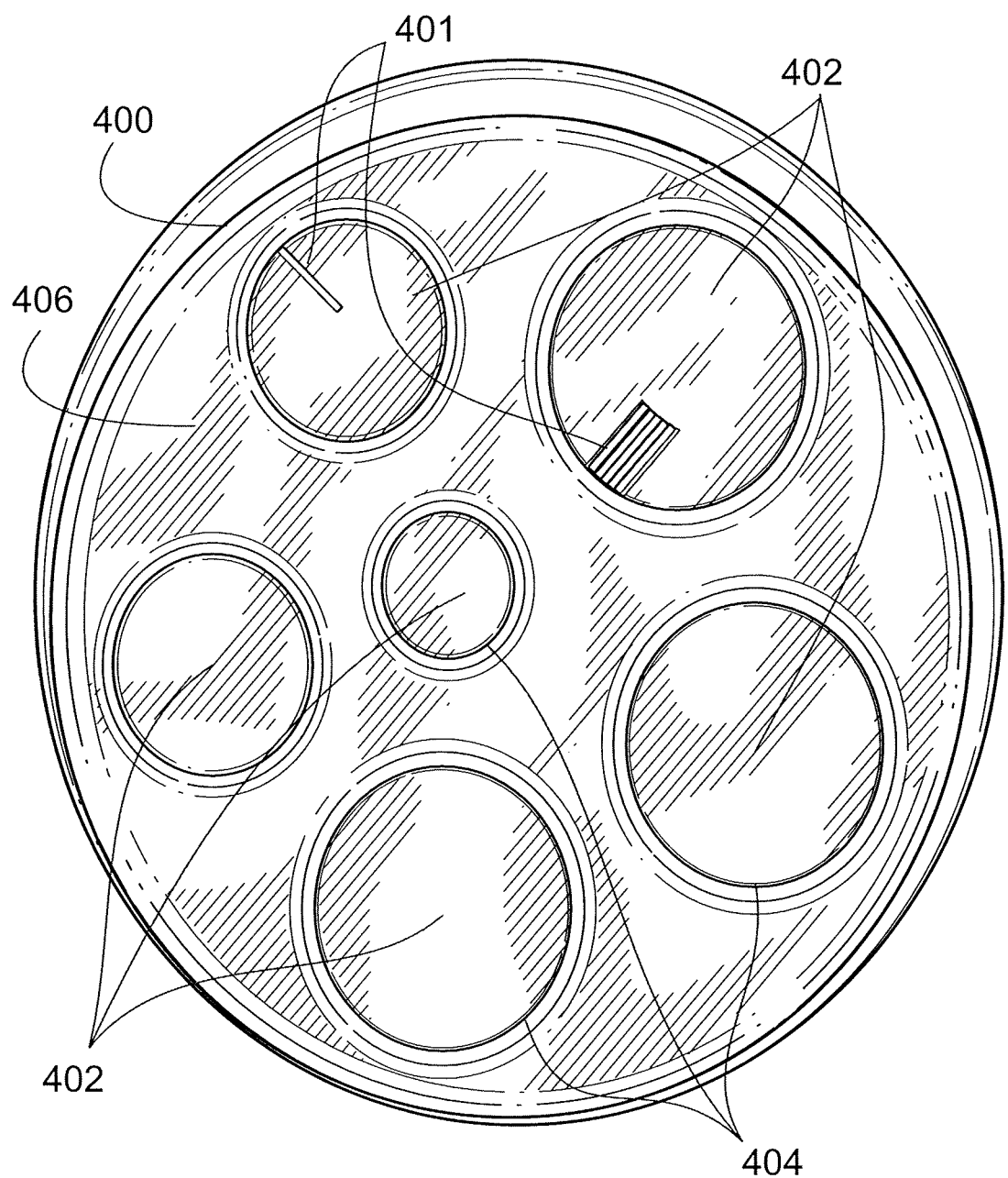
FIG. 5 shows a wire separator insulator of the current disclosure.
Figure 6:
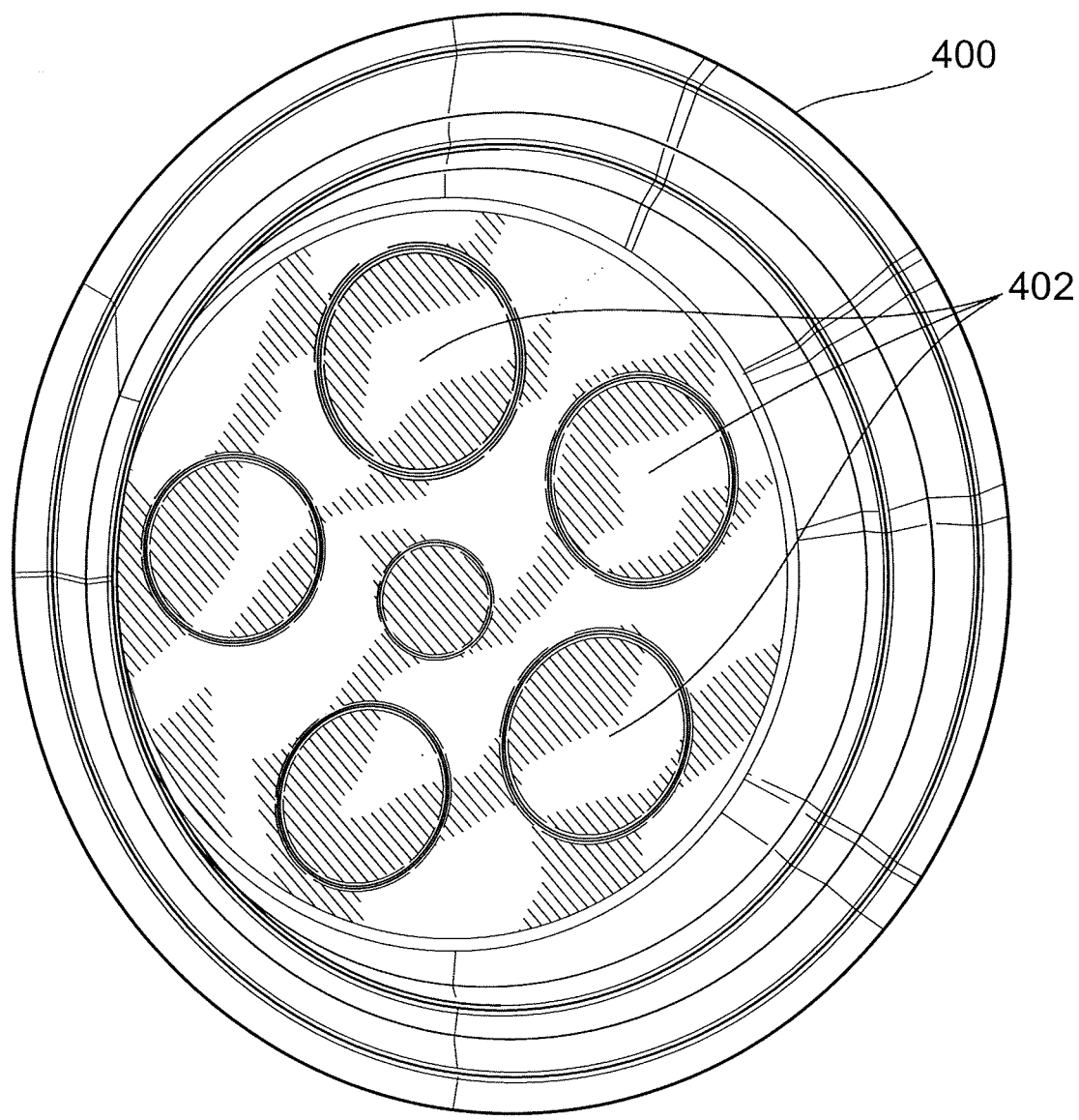
FIG. 6 shows a bottom view of a wire separator insulation of the current disclosure.

FIGS. 5 and 6 show one embodiment of a wire separator insulator 400 that may be used with the current disclosure. Wire separator insulator 400 may also define openings via removable sections 402 to accommodate different sized wiring/lines into service entrance cap 100 via creating narrow openings to admit the wiring/lines while keeping the remainder of the separator insulator solid and sealed against the elements. The narrow openings may be formed via removing or "popping out" removable sections 402, which may be created by forming a weakened border 404 in wire separator insulator surface 406. While removable sections 402 are shown as circular or substantially circle, any shape may be employed for the openings such as polygons, ellipses, irregular shapes, designs such as stars, figures, etc. Further, separator insulator 400 may define slots 401 in removable sections 402 that will be removed instead of removing the entirety of removable section 402 by specifically shaping or designing weakened border 404 to leave any desired shape behind once removable section 402 is removed. Wired separator insulator may be formed from plastics, synthetics, nonwovens, ceramics, etc., as known to those of skill in the art. In a preferred embodiment, plastic may be employed such as HWPE.

Figure 7:
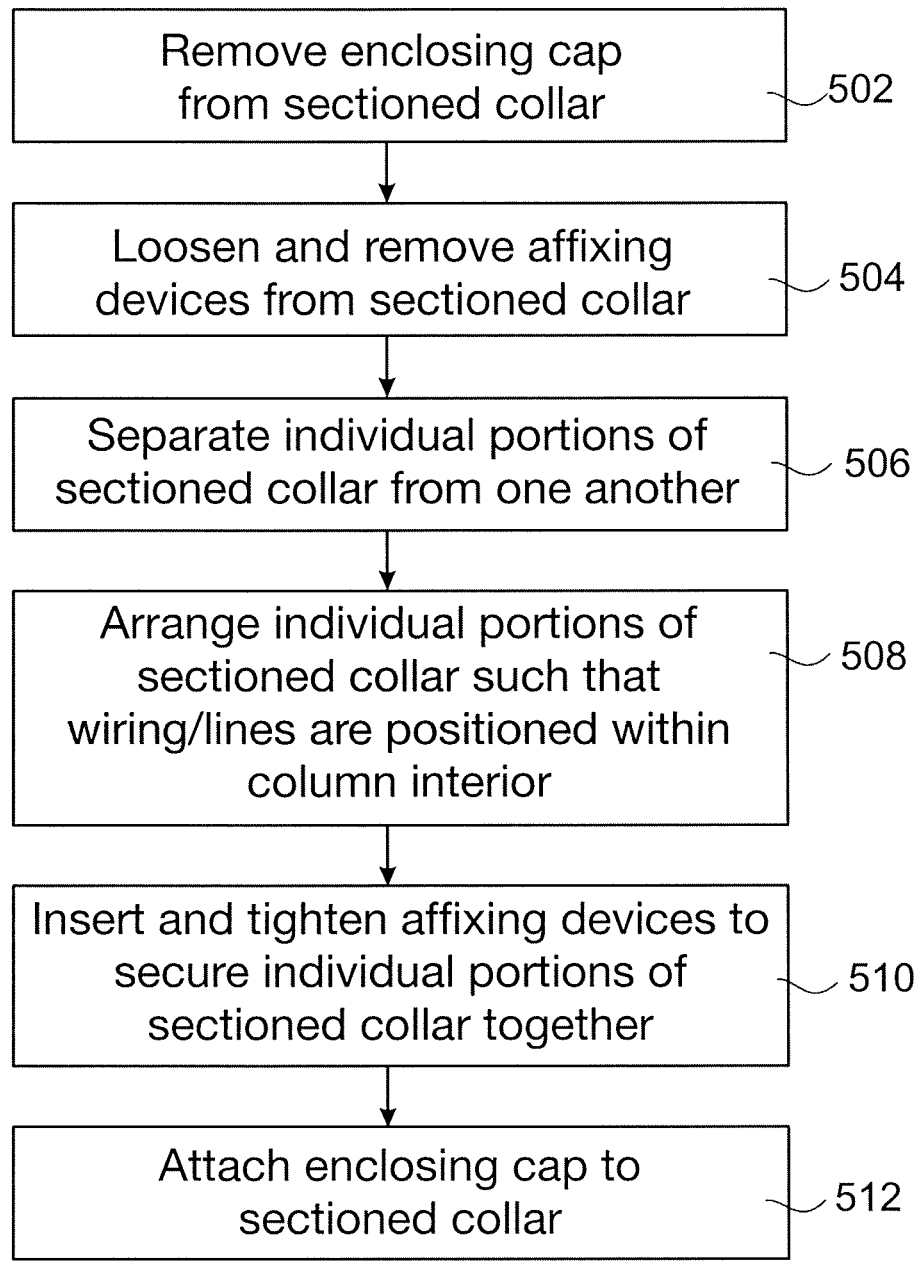
FIG. 7 shows a schematic of an installation method of the current disclosure.

In a further embodiment, see FIG. 7, method 500 may be provided for installing or replacing a service entrance cap without severing or otherwise disconnecting wires contained within original service entrance cap 100 or wires that have been previously installed but wherein no service entrance cap is in place. At step 502, one removes the enclosing cap from the segmented collar, however, this step may be omitted if no cap is present, this may be done by loosening screws or other fixtures that secure the enclosing cap to the sectioned mounting collar. At step 504, one loosens and removes the affixing devices from the sectioned mounting collar. At step 506, one separates individual portions of the sectioned mounting collar from one another. At step 508, one arranges the individual portions of the sectioned mounting collar such that the wiring/lines are positioned within the column interior of the sectioned mounting collar. At step 510, one inserts and tightens the affixing devices to secure individual portions of the sectioned mounting collar together, thereby securing the wiring/lines within the sectioned mounting collar in the column interior. At step 512, one finalizes the installation/replacement by attaching the enclosing cap to the sectioned mounting collar. In a further embodiment, the current disclosure may provide a kit for installation of a service entrance cap. The kit may include a sectioned mounting collar 106, an enclosing cap 101 and a wire separator insulator 400.

Figure 8:
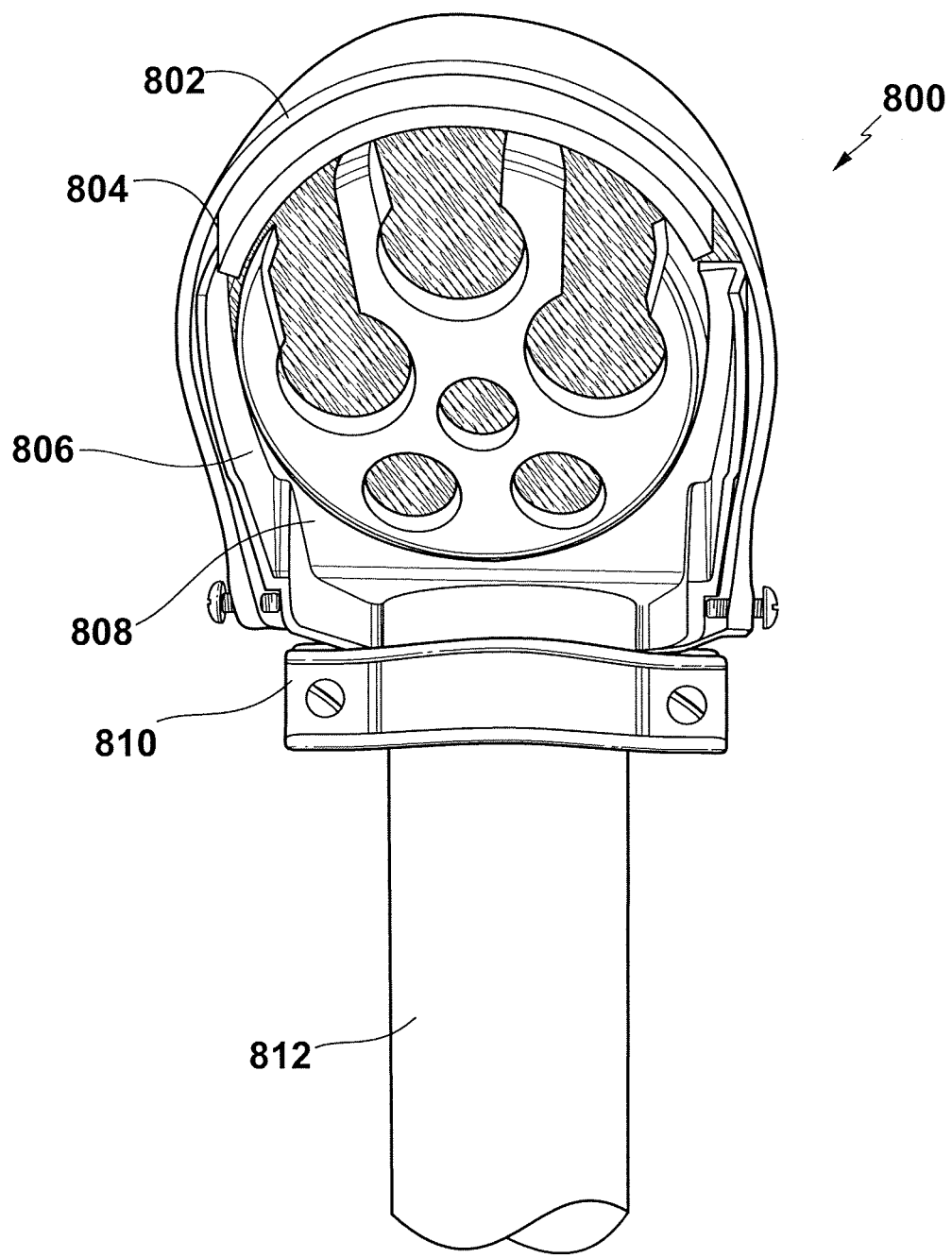
FIG. 8 shows an alternative embodiment of an improved service entrance cap of the current disclosure.

FIG. 8 shows a further embodiment of an improved service entrance cap support 800. FIG. 8 shows an assembled view of improved service entrance cap support 800. In this embodiment, a solid entrance cap 802 may cover a multi-piece separator 804 which rests within holding or support ridge 806 of insulator support ledge 808 which forms part of detachable conduit collar 810, which may be a sectioned mounting collar as shown in FIG. 4, which at least substantially, if not completely, encircles conduit 812. Solid entrance cap may be made of plastics, synthetics, metals, nonwovens, or other materials as known to those of skill in the art. In a preferred embodiment, solid entrance cap 802 may be formed from metal and/or plastic. Multi-piece separator 804 may be made from polyethylene, cross-linked polyethylene (either through electron beam processing or chemical crosslinking), rigid laminate, varnish, resin, PVC, Kapton, Cresyl Pthalate, DEHP, rubber-like polymers, oil impregnated paper, Teflon, silicone, or modified ethylene tetrafluoroethylene (ETFE), Bakelite®, compressed inorganic powder, glass, plastic, rubber, mica, perfluoroalkoxy, etc., as known to those of skill in the art. Support ridge 806 may be placed or tilted at an angle to conduit collar 810 such as 5, 10, 15, 20, 25, 30, 35, 40, 45, 50, 60, 65, 70, 75, 80, 85, or 90 degrees. In one embodiment, support ridge 806 may be positioned between 20-90 degrees to conduit collar 810 and in a further embodiment, may be positioned at approximately 45 degrees with respect to the plane running parallel to the top of conduit collar 810.

Figure 9:
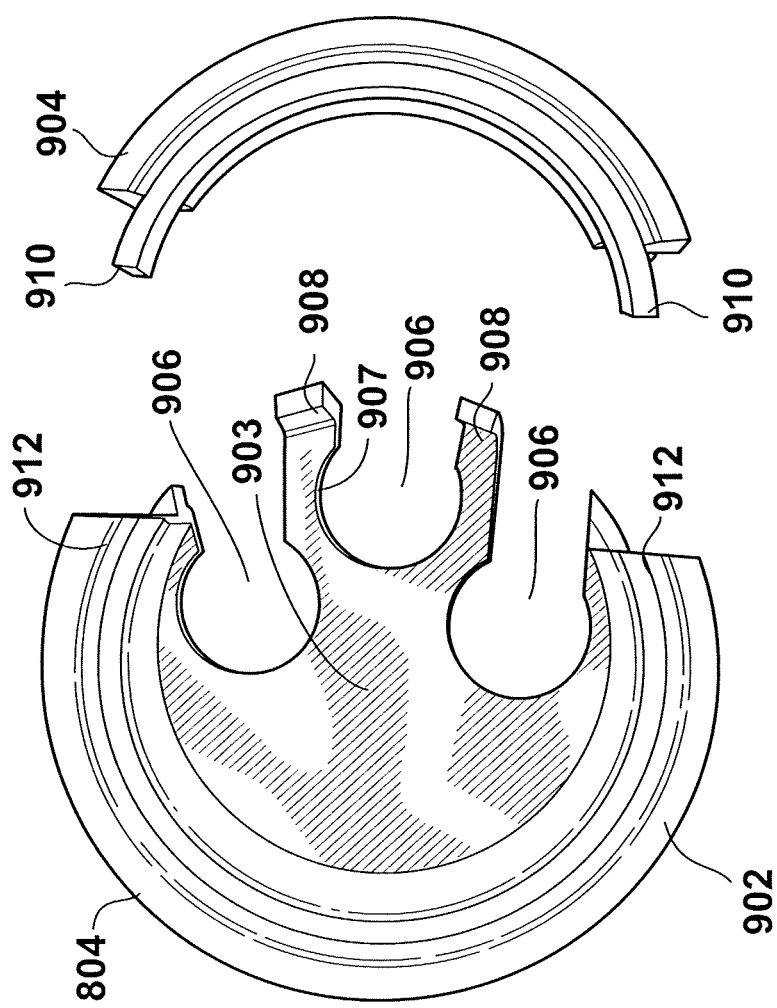
FIG. 9 shows a multi-piece separator separated into component parts.

FIG. 9 shows a multi-piece separator 804 separated into component parts wire support 902 and enclosing brace 904. Wire support 902 may define openings 906 formed by creating frangible breaks 907 around a perimeter of openings 906 so that a user may simply press or otherwise use force to create openings 906 by removing a seal piece, not shown, and leaving separator arms 908 intact and extending outward from wire support body 903. Enclosing brace 904 may frictionally engage wire support 902 via engaging arms 910. While two arms are shown, less or more arms are herein disclosed. For instance, a single arm may be employed or enclosing brace 904 may be configured to possess 3, 4, 5, 6, or more engaging arms. Engaging arms 910 may frictionally engage with inner circumference 912 of wire support 902 to secure the two together. Further, engaging arms 910 may be formed to engage with wire support 902 through male/female engagement, mating surface attachment or other means as known to those of skill in the art. In a further embodiment, wire support 902 and enclosing brace 904 may join via grooves placed in wire support 902 to accommodate and/or receive engaging arms 910. Other ways of joining may include hinging one side of the wire support 902 to enclosing brace 904. Further, wire support and enclosing brace 904 may be formed to possess locking engagement wherein engaging arms 910 may be locked into place with wire support 902 such as via anchors, prongs, adhesives, etc., that would allow the pieces to be joined and then not separated without having to deform or break wire support 902 and/or enclosing brace 904. This may be employed for security purposes or to ascertain if access has been gained to a service head. Also, while engaging arms 910 may be formed on enclosing brace 904, they may also be formed on wire support 902 and then engage enclosing brace 904 as discussed supra with respect to wire support 902. Further, enclosing brace 904 may serve as insulation between the wires engaged within wire support 902 and entrance cap 802 as well as be designed to overlap circumference 909 of wire support 902 via strengthening ridge 911 which prevents rotation of wire support 902 and enclosing brace 904 via contact with support ridge 806 at support ridge edge 913.

Figure 10:
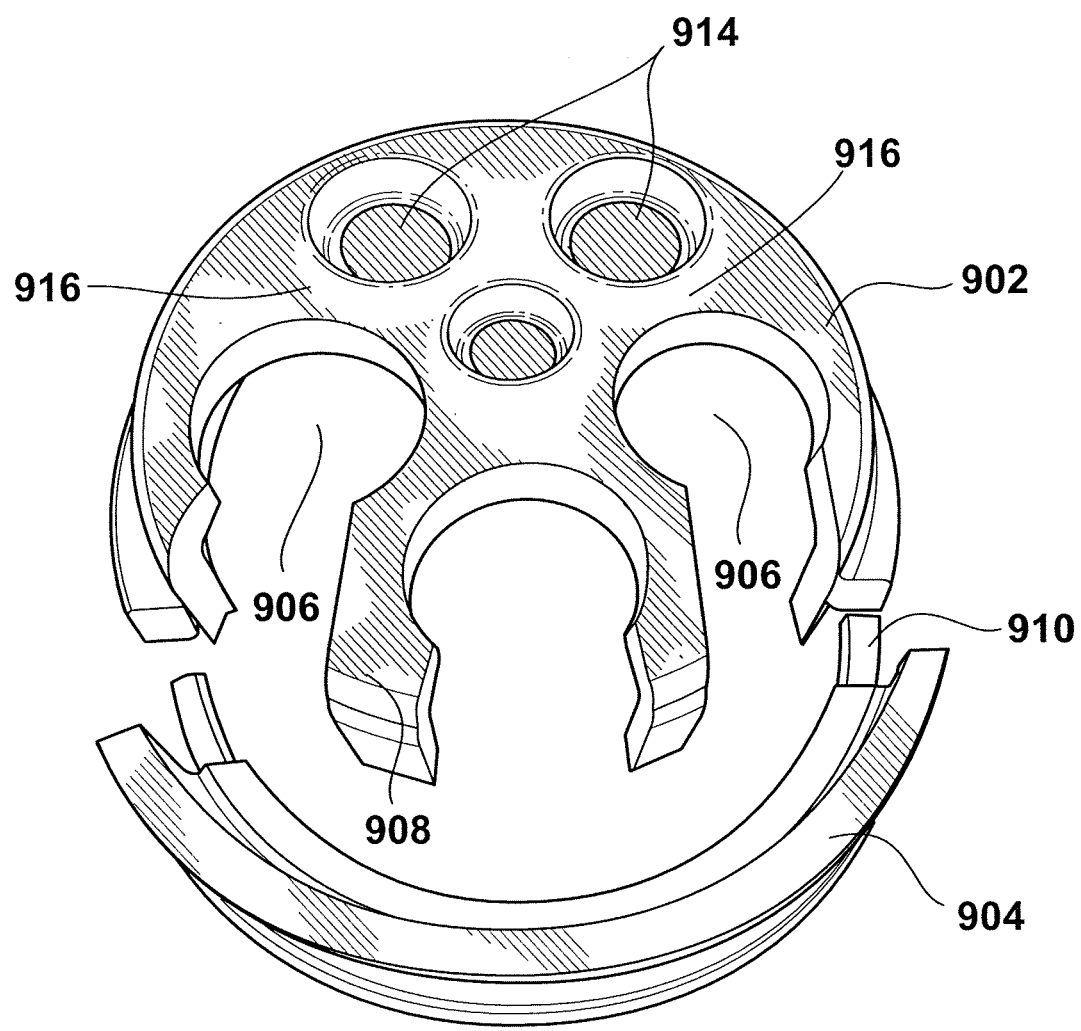
FIG. 10 shows a top down view of multi-piece separator with some frangible seal pieces left intact.

FIG. 10 shows a top down view of multi-piece separator 804 with some frangible seal pieces 914 left intact. The frangible seal pieces may be removable sections that a user may remove from the wire support body to form cavities or openings in the multi-piece separator 804. Further, divider walls 916 may also be formed to be removable, such as via frangible sections, cutting, etc., so that additional openings 906 may be formed within wire support body 903.

Figure 11:
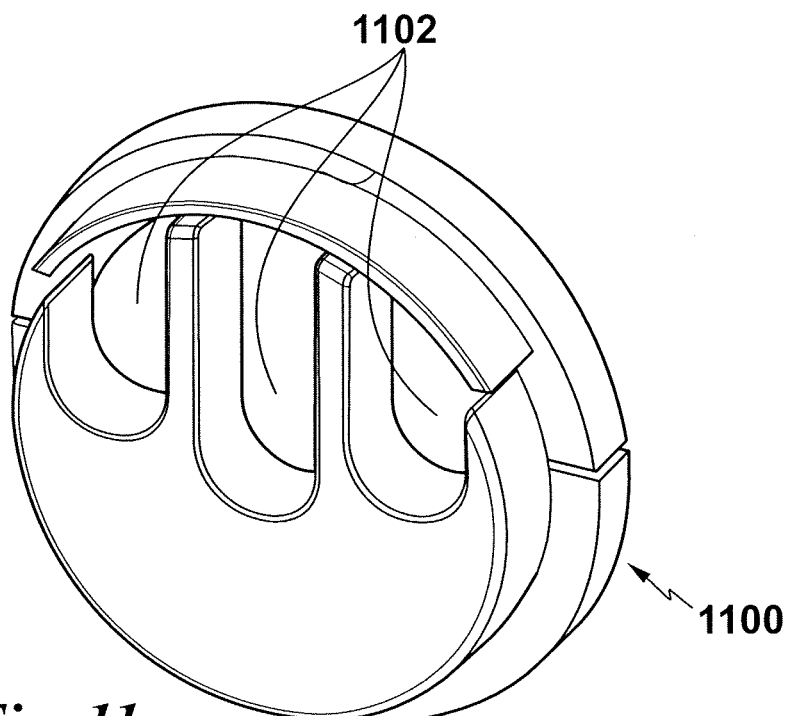
FIG. 11 shows an alternative embodiment of a multi-piece separator wherein there are no frangible spaces, only slots formed in the separator.
Figure 12:
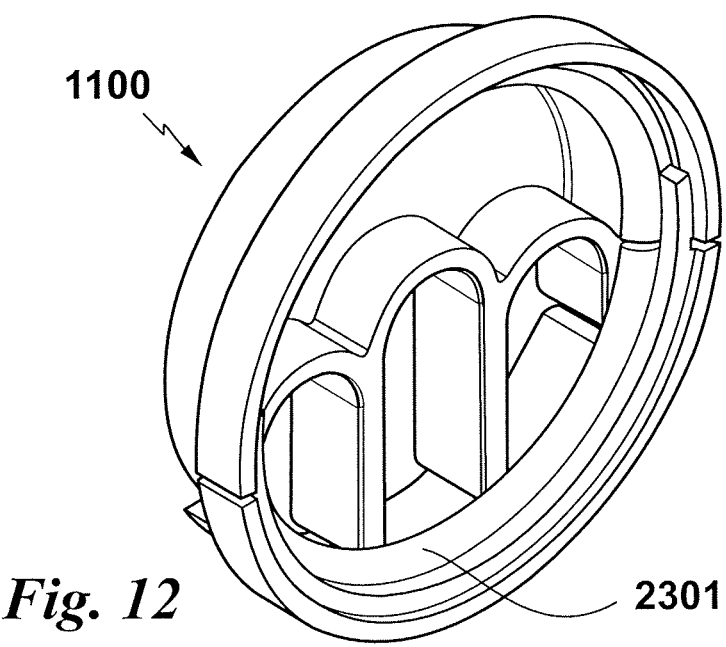
FIG. 12 shows a rear view of FIG. 11.
Figure 22A:
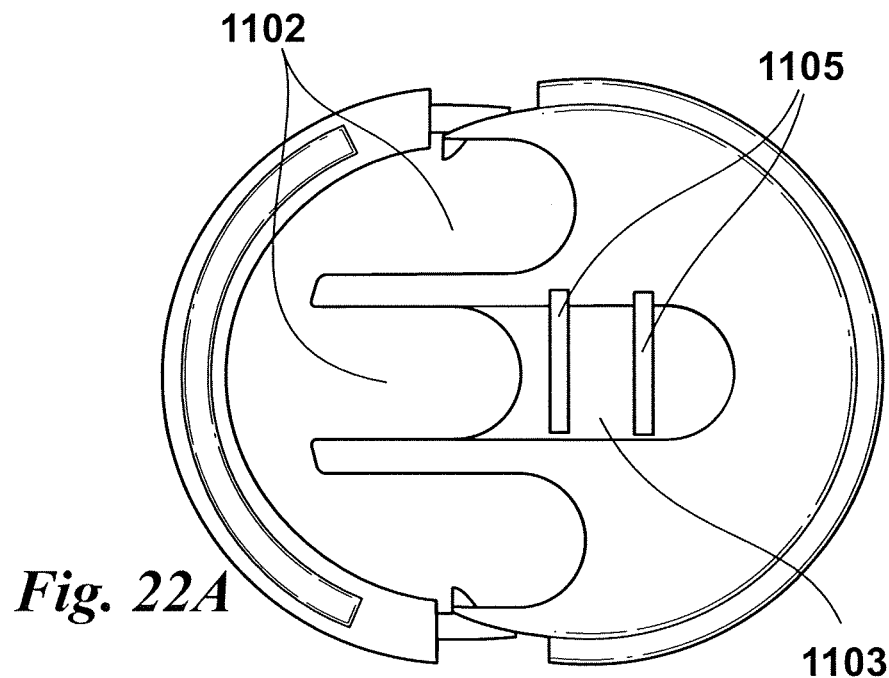
FIG. 22A shows an alternative embodiment, wherein slots may be "deepened" or "lengthened" via snapping out frangible section(s) to create a preferred slot size.

FIG. 11 shows an alternative embodiment 1100 of another multi-piece separator wherein there are no frangible sections to remove, only slots 1102, that allow for insertion of wires, cabling, etc., into slots 1102. FIG. 12 shows a rear view of FIG. 11. With respect to slots 1102, these may be of varying lengths/depths with respect to one another, all the same length, all with different lengths. The lengths/depths may be determined based on the use for the service head as well as the wire/cabling/etc., being protected. FIG. 22A shows an alternative embodiment, wherein slots 1102 may be "deepened" or "lengthened" via snapping out frangible section(s) 1103 in order to create a preferred slot size. FIG. 22A shows the right and left slots 1102 with all frangible sections 1103 removed whereas the middle slot 1103 has remaining frangible section(s) 1103 remaining, which may be further removed via snapping or otherwise disengaging perforation line 1105. Multiple perforation lines 1105 may be defined within the entirety of the length of frangible section(s) 1103 in order to allow a user to select a precise or desired depth or length to the slots via removing the desired frangible sections 1103 at perforation lines 1105. Perforations lines 1105 may be of any preferred shape, such as straight, curved, angular, etc., in order to accommodate whatever wiring, cabling, etc., is being fed through the device.

Figure 22B:
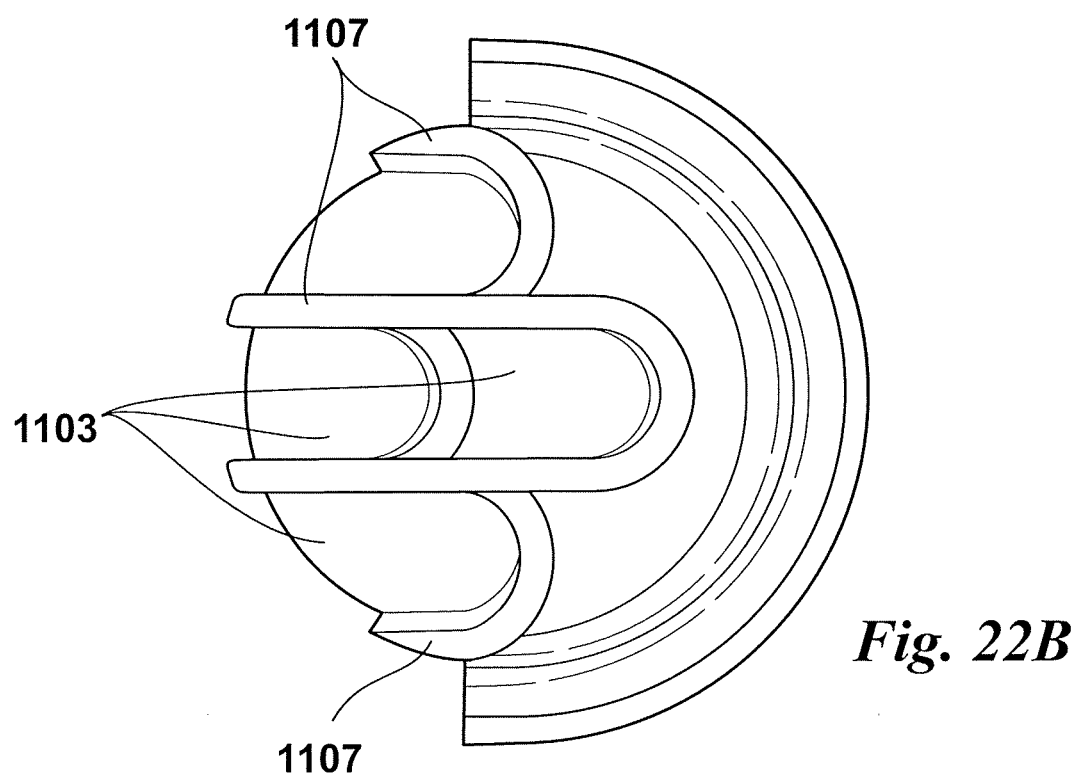
FIG. 22B shows a back view of FIG. 22A with the frangible sections in place and showing structural supports that strengthen the wire separator.

FIG. 22B shows a wire separator with frangible sections 1103 in place. Further, FIG. 22B shows support/insulation structures 1107 these may be raised ridges or walls that serve to keep the insulator structurally sound and help add stability and strength to the multi-piece separator and helps further encapsulate wiring, cabling, etc., contained within the wire separator. In the field, wiring or cabling may be very heavy and cumbersome to place in the wire separator requesting the user to exert significant force to bend, contort or otherwise shape the cabling/wiring to fit within the wire separator. Element 1107 helps provide strength to the wire separator and prevents the cabling/wiring from breaking or damaging same during installation of the cabling/wiring into the wire separator.

Figure 23A:
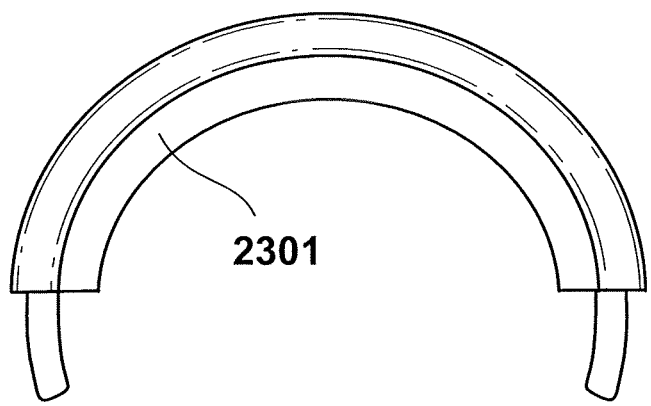
FIG. 23A shows a downward, internal view of an enclosing brace showing an internal support ledge.
Figure 23B:
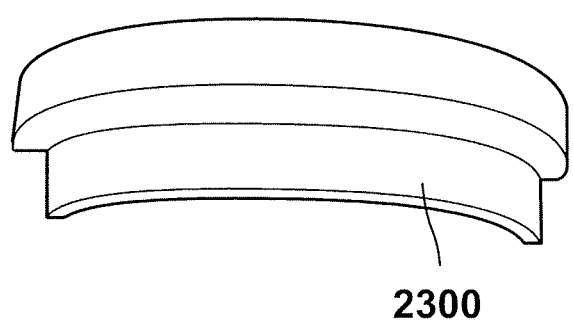
FIG. 23B shows a downward view of an enclosing brace which shows a retention ring.

FIG. 23A shows a downward, internal view of enclosing brace 904 showing internal support ledge 2301, which helps support wire separator 902 and further ensure a tight fit between the pieces. FIG. 23B shows a downward view of enclosing brace 904 which shows retention ring 2300 that fits into and helps secure multi-piece wire separator 804 into service cap 802 via frictional engagement.

Figure 13:
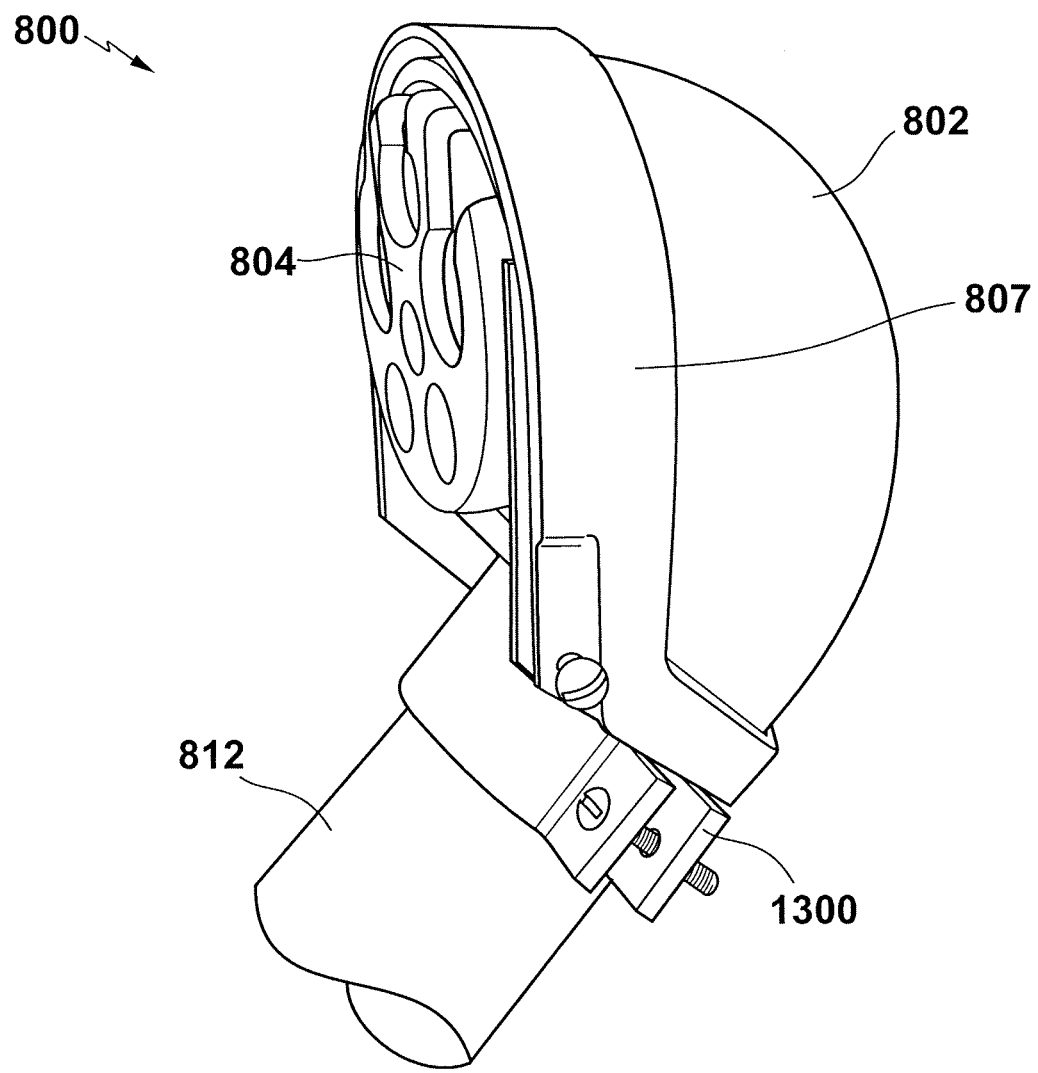
FIG. 13 shows a side view of an assembled view of an improved service cap of the current disclosure.
Figure 14:
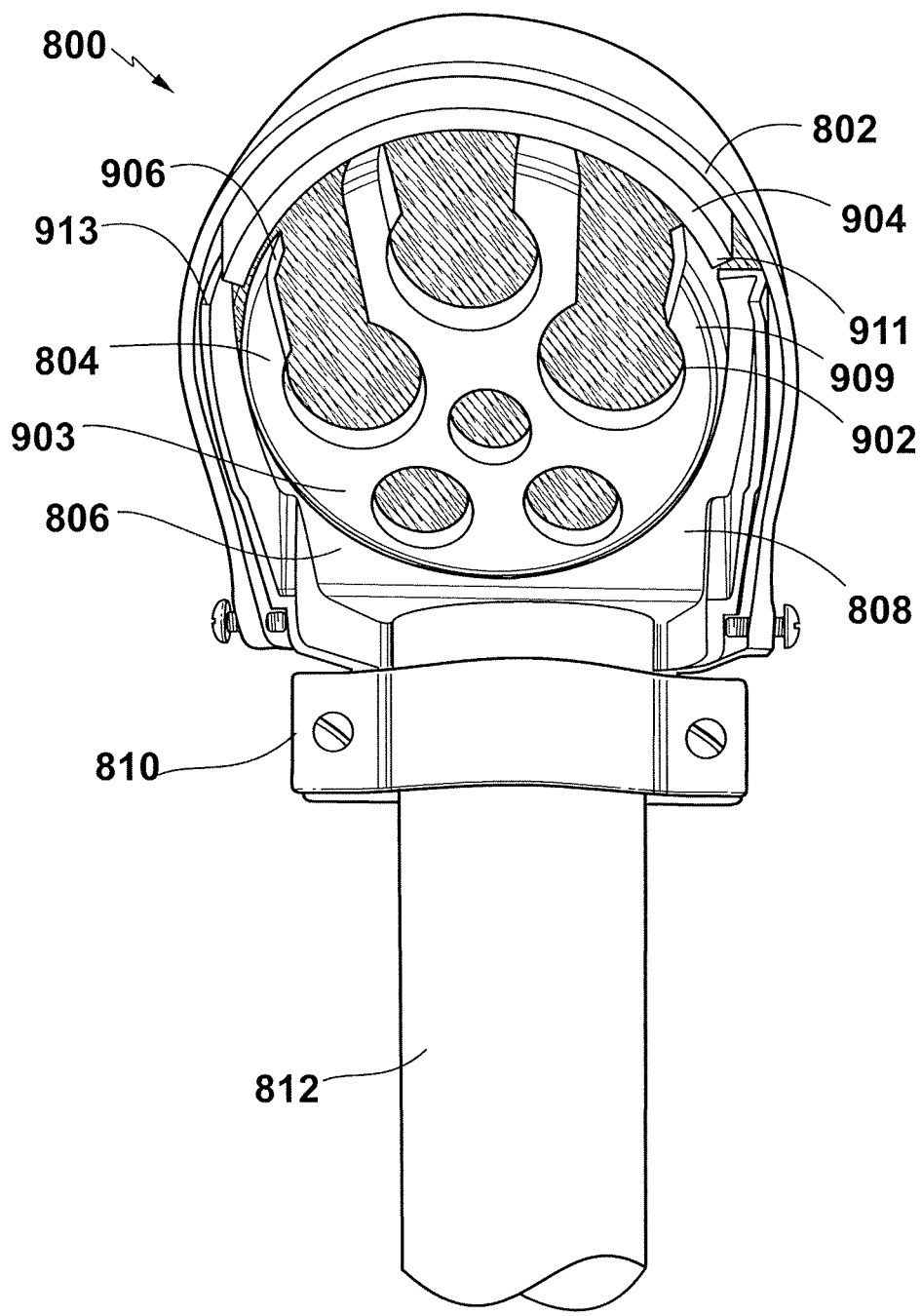
FIG. 14 shows an underneath view of FIG. 13.
Figure 15:
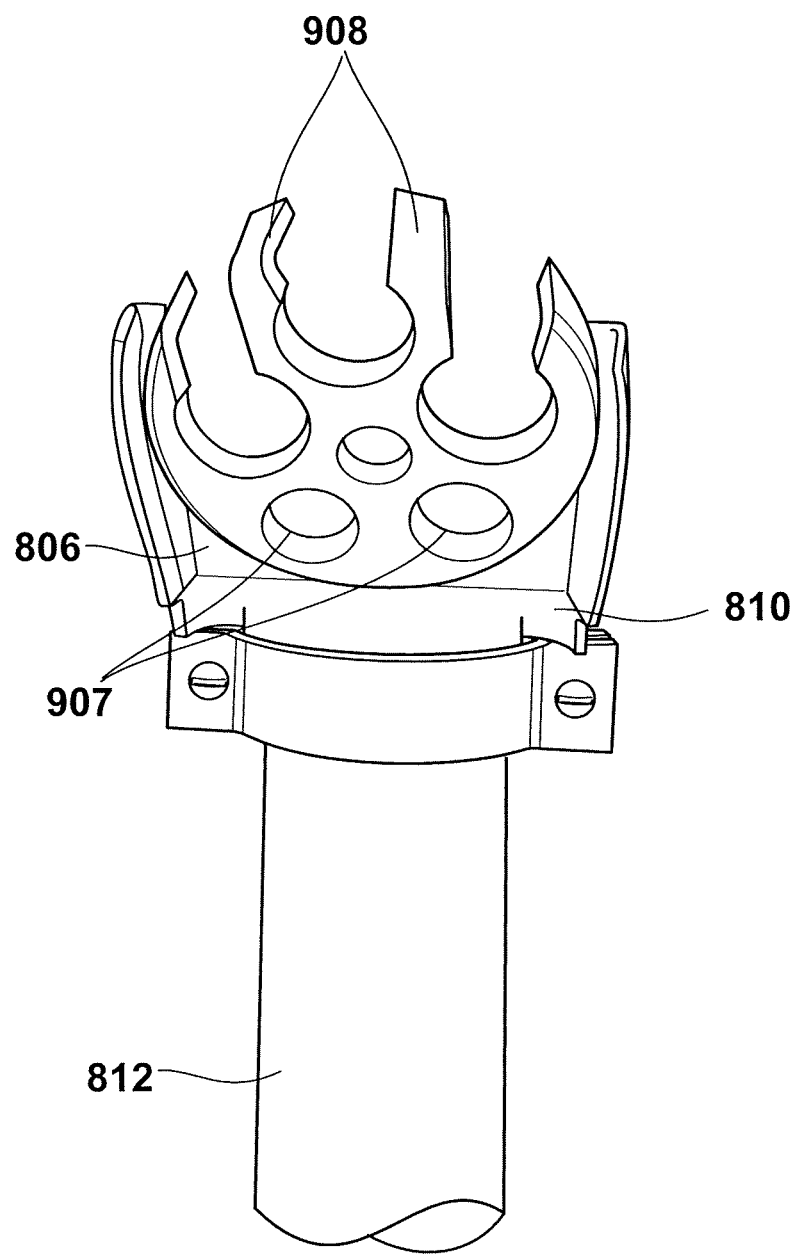
FIG. 15 shows a partially disassembled view of FIG. 13.
Figure 16:
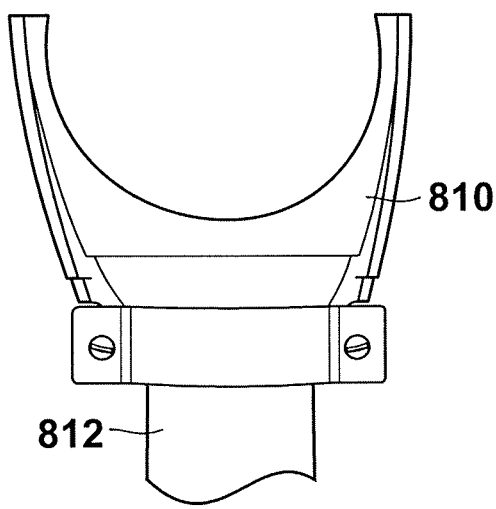
FIG. 16 shows a further disassembled view of FIG. 13.
Figure 17:
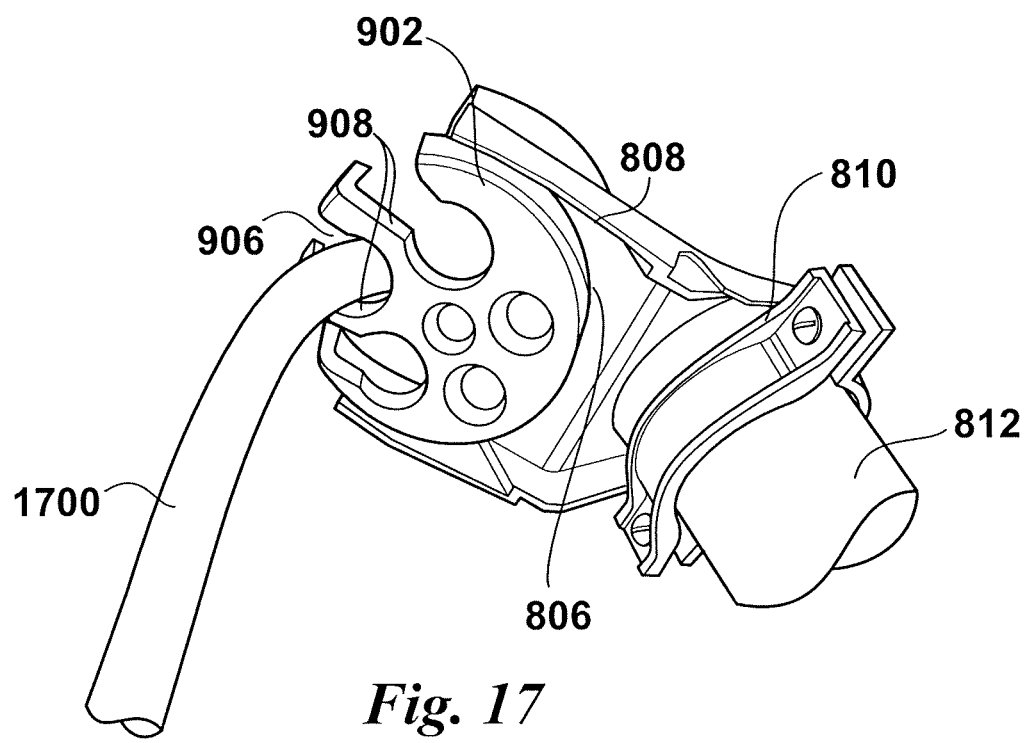
FIG. 17 shows a cable running through an opening and between separator arms in a multi-piece separator and running into conduit.
Figure 18:
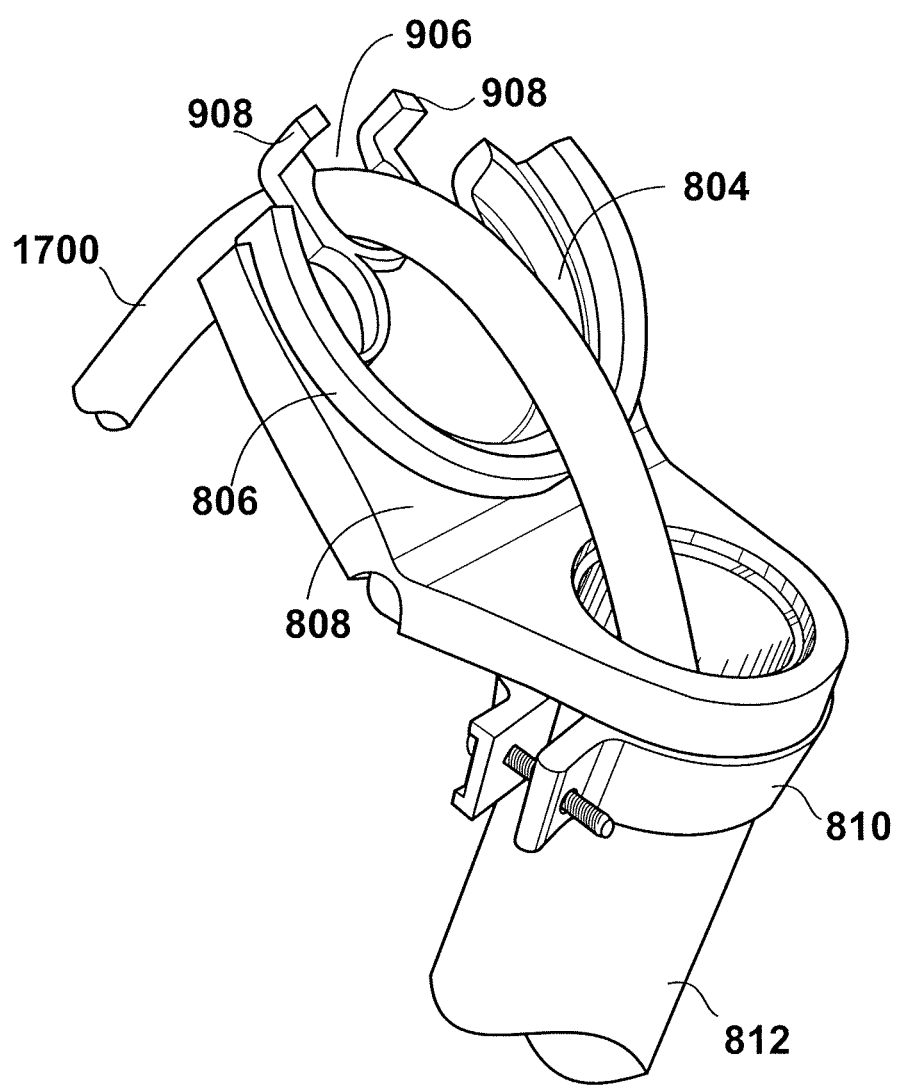
FIG. 18 shows an alternate view of FIG. 17.

FIG. 13 shows a side view of an assembled view of an improved service cap 800 of the current disclosure with a further embodiment of sectioned mounting collar 810 comprised of polymers as opposed to a metal. In further embodiments, sectioned mounting collar 810 may be 3-D printed for time and cost efficiency. Additionally, cap 800 may define ridge 807 which surrounds and engages over multi-piece separator 804 and support ledge 808 to secure same together as well as prevent movement and/or rotation of both. Ridge 807 may be designed to match the "height" of multi-piece separator 804 and/or support ledge 808. FIG. 14 shows an underneath view of FIG. 13. FIG. 15 shows a partially disassembled view of FIG. 13 wherein solid entrance cap 802 and enclosing brace 904 have been removed. FIG. 16 shows a further disassembled view of FIG. 13. FIG. 17 shows a cable 1700 running through opening 906 between separator arms 908 in multi-piece separator 804, engaged with wire support 902 and running into conduit 812. FIG. 18 shows an alternate view of FIG. 17. While conduit 812 is shown as round, the current disclosure is not so limited. Sectioned mounting collar 810 may be formed to fit over pipe nipples, square pipe, irregularly shaped pipe, hoses, tubing, etc., and is not limited to simply a round shape as it may be angular, round, or irregularly shaped to fit over the desired mounting surface. This disclosure essentially protects any hollow opening containing internal wiring, tubing, cabling, etc.

FIG. 19 shows a one-piece, prior art wire separator 1702. This figure shows the need for the current disclosure's improved service entrance cap as there is no way to "thread" a live cable 1700, i.e., a cable connected at both ends, through prior art separator 1702 as cable 1700 would be connected to power or data lines, not shown, and run into electrical boxes, receivers, etc., not shown, inside a building via conduit 812. There would be no way to install prior art wire separator 1702 without cutting live cable 1700.

FIG. 20 shows a comparison of one embodiment of wire support 902 vis-à-vis a further embodiment of a hybrid support 2000. Hybrid support 2000 combines former wire support 902 with insulator support ledge 808 into uniform support 2002 that may then engage with enclosing brace 904, not shown, to secure cable 1700, not shown.

Figure 21:
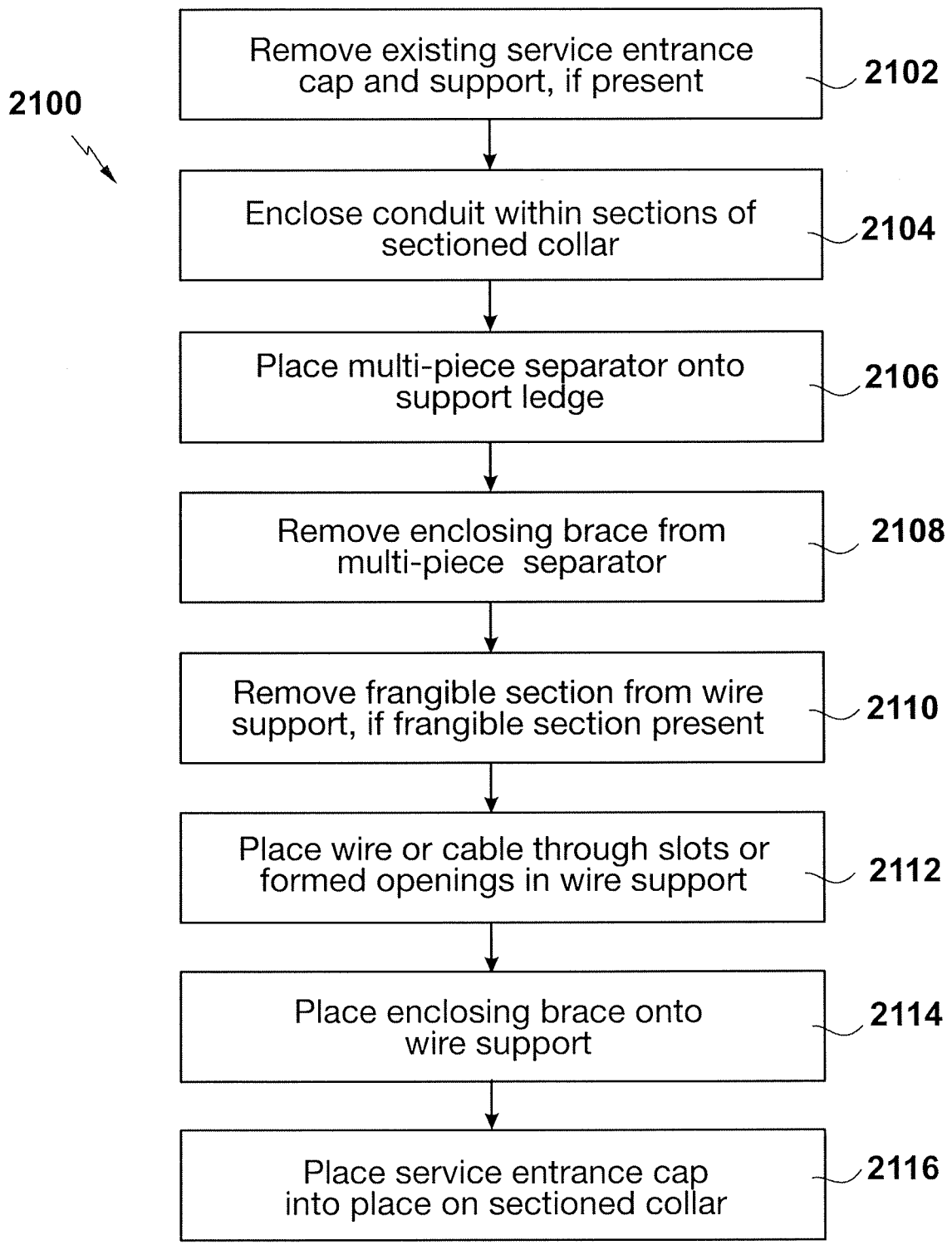
FIG. 21 shows a method of replacing an existing service entrance cap with a service entrance cap support of the current disclosure

FIG. 21 shows a method 2100 of replacing an existing service entrance cap with a service entrance cap support of the current disclosure. At step 2102, one may remove the existing service entrance cap and service entrance cap support, if present. At step 2104, one encloses an upper portion of a conduit within the sections forming the sectioned mounting collar so that the conduit is at least partially enclosed by the sections, if not completely enclosed. At step 2106, the multi-piece separator is placed onto a support ledge. This may be accomplished by either placing just a wire separator onto the ledge or placing the wire separator and enclosing brace conjoined to one another onto the ledge. If the conjoined wire separator and enclosing brace are placed onto the ledge, at step 2108 the enclosing brace is removed from the multi-piece separator. If the wire support possesses frangible sections, these may be removed at step 2110. If instead, the wire separator possesses slots, as described herein, this step may be omitted. At step 2112, wire, cable, or other cable or wire like constructs may be placed in the openings defined by the frangible sections or the slots in the wire separator. Individual wires may be placed in individual slots or openings to keep them separator from one another. At step 2114, once all cable or wiring is placed into the slots or openings, the enclosing brace is placed, if not originally removed, or reengaged with the wire support to secure the wires or cabling with the body of multi-piece separator. At step 2116, a service entrance cap may be placed on the sectioned mounting collar and secured to complete the installation. As explained herein, the current service entrance cap support via its separable collar and multi-piece separator allows for replacement of an existing service entrance cap, or replacement of a damaged one, or for addition of additional wire or cabling into a building without having to sever the wire or cabling entering the building as is currently the practice. The current disclosure greatly increases efficiency and time needed for running new cable or replacing existing service entrance heads.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An improved service entrance cap support comprising:
   a sectioned mounting collar comprising at least two sections;
   a receiving column formed from the at least two sections of the sectioned mounting collar;
   a multi-piece wire separator comprising at least a wire support and an enclosing brace;
   an insulator support configured to hold the multi-piece wire separator; and
   wherein the insulator support is tilted from 20-90 degrees with respect to the sectioned mounting collar.

2. The improved service entrance cap support of claim 1, wherein the at least two sections of the sectioned mounting collar are separable and rejoinable to one another.

3. The improved service entrance cap support of claim 1 shaped to fit a service entrance head cap.

4. The improved service entrance cap support of claim 1, wherein the multi-piece wire separator includes removable sections.

5. The improved service entrance cap support of claim 1, wherein the multi-piece wire separator includes at least one slot.

6. The improved service entrance cap support of claim 1, wherein the enclosing brace includes at least one engaging arm.

7. The improved service entrance cap support of claim 6, wherein the enclosing brace engages with the wire support via the least one engaging arm.

8. The improved service entrance cap support of claim 1, wherein the sectioned mounting collar forms an inner support ledge.

9. The improved service entrance cap support of claim 1, wherein the enclosing brace comprises at least two sections.

10. The improved service entrance cap support of claim 1, wherein the wire support and the enclosing brace are separable and rejoinable to one another.

11. A method for forming an improved service entrance cap support comprising:
   forming a sectioned mounting collar comprising at least two sections;
   forming the at least two sections to define a receiving column;
   forming a multi-piece wire separator comprising at least a wire support and an enclosing brace; and
   forming an insulator support configured to hold the multi-piece wire separator,
   wherein the insulator support is tilted from 20-90 degrees with respect to the sectioned mounting collar.

12. The method of claim 11, wherein the at least two sections of the sectioned mounting collar are formed to be separable and rejoinable to one another.

13. The method of claim 11, wherein the improved service entrance cap support is shaped to fit a service entrance head cap.

14. The method of claim 11, wherein the multi-piece wire separator is formed with removable sections.

15. The method of claim 11, wherein the multi-piece wire separator is formed to include at least one slot.

16. The method of claim 11, wherein the enclosing brace is formed to include at least one engaging arm.

17. The method of claim 16, wherein the enclosing brace engages with the wire support via the at least one engaging arm.

* * * * *